United States Patent [19]

Giorgio

[11] Patent Number: 4,912,672

[45] Date of Patent: Mar. 27, 1990

[54] COMPUTER PERIPHERAL RATE AIDED SENSING SYSTEM

[76] Inventor: Paul J. Giorgio, 285 River Ave., Providence, R.I. 02908

[21] Appl. No.: 146,744

[22] Filed: Jan. 15, 1988

[51] Int. Cl.⁴ .............................................. G06F 3/033
[52] U.S. Cl. ...................... 364/900; 340/710; 364/929.12
[58] Field of Search ... 364/200 MS File, 900 MS File, 364/518; 340/710

[56] References Cited

U.S. PATENT DOCUMENTS

| | | | |
|---|---|---|---|
| 4,689,761 | 8/1987 | Yurchenco | 364/900 X |
| 4,787,051 | 11/1988 | Olson | 340/710 X |
| 4,799,049 | 1/1989 | Avila | 340/710 X |
| 4,807,166 | 2/1989 | Zalenski | 340/710 X |
| 4,818,978 | 4/1989 | Kurihara et al. | 340/710 X |

Primary Examiner—Thomas M. Heckler
Attorney, Agent, or Firm—Michael J. McGowan; Prithvi C. Lall

[57] ABSTRACT

A sensing system connects to a switch display encoder apparatus and monitors the rotational speed of a plurality of encoders in all directions independently and responds to rate-aided commands issued by the user or by a Central Processing Unit (CPU). As the encoders spin in any direction, a quadrature output signal from each encoder is sent to the sensing system which processes the raw quadrature data and transmits, via an output controller, a rate-aided signal to the CPU. The CPU can interactively issue commands to the system which changes the speed thresholds and rate-aided output signals. The user can preset and interactively change speed thresholds and rate-aided outputs via switches mounted on the apparatus. Parameters settings are transmitted to the sensing system and to an external CPU. The apparatus contains numeric displays that indicate switch selected or CPU instructed speed thresholds, rate-aid multipliers, or rate-aid dividers.

16 Claims, 3 Drawing Sheets

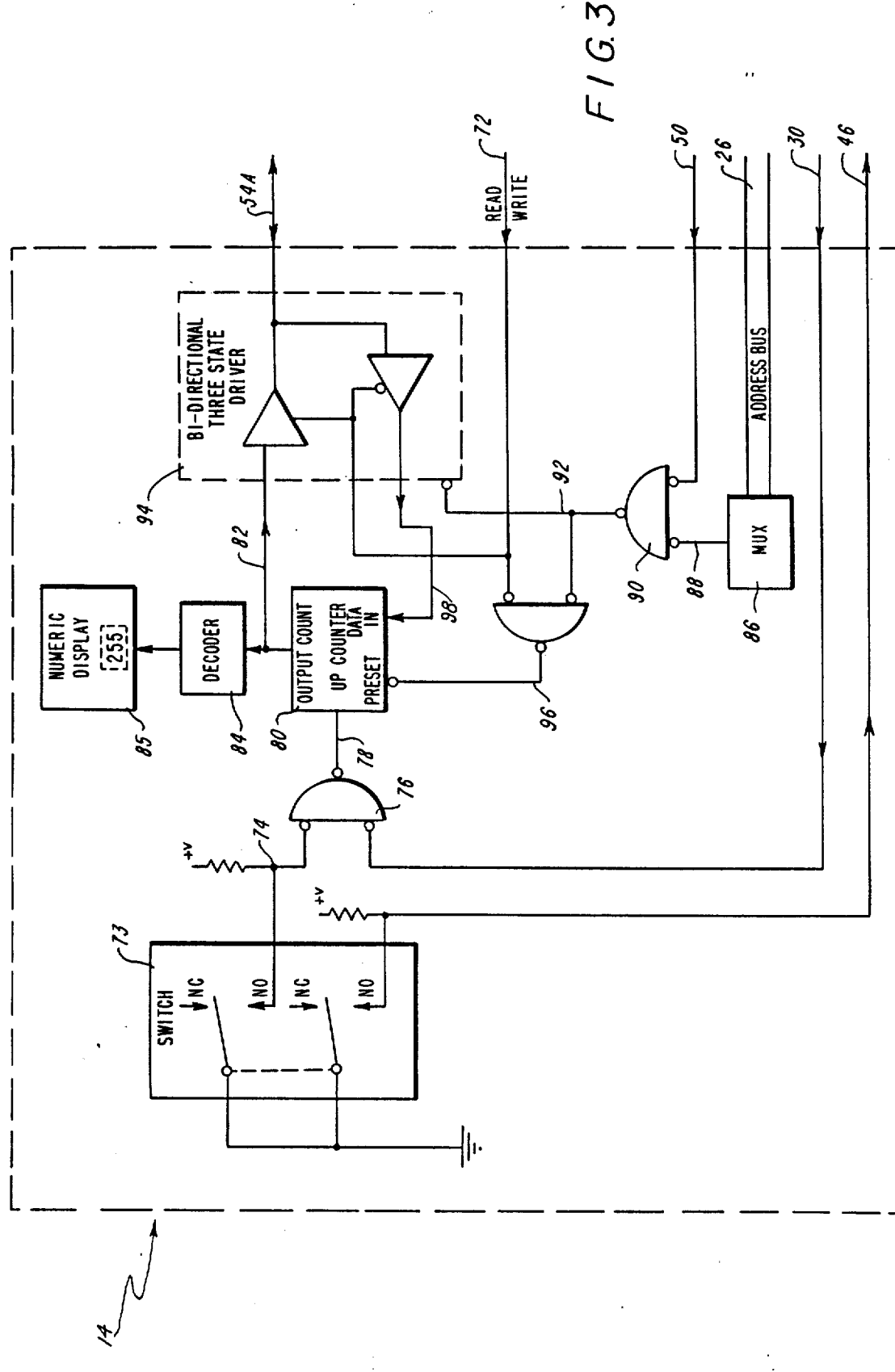

ND RATE AIDED# COMPUTER PERIPHERAL RATE AIDED SENSING SYSTEM

STATEMENT OF GOVERNMENT INTEREST

The invention described herein may be manufactured and used by or for the Government of the United States of America for governmental purposes without the payment of any royalties thereon or therefor.

COMPUTER PERIPHERAL RATE AIDED SENSING SYSTEM

This patent application is co-pending with related patent application Ser. No. 07/146,743 entitled "Switch Display Encoder Apparatus" by the same inventor filed on the same date as this patent application.

BACKGROUND OF THE INVENTION

(1) Field of the Invention

The present invention describes a sensing system that monitors the rotational speed of a trackmarble, mouse, fingerwheel, trackball or any group of linear shaft encoders in all directions independently and responds to rate-aided commands issued by the user or by a Central Processing Unit (CPU).

Trackmarbles are compact devices that contain optical encoders to generate digital signals by rotation of a ball. The trackmarble outputs X (left/right or horizontal) and Y (up/down or vertical) quadrature square waves. Trackmarbles lend themselves to many applications and are specifically oriented to Computer Aided Design (CAD), Computer Aided Engineering (CAE) and "user friendly" computer peripheral devices. One such example is a mouse, whereby the trackmarble is contained within an apparatus and by moving the apparatus on a flat surface the trackmarble rotates, thereby moving the cursor on a cathode ray tube (CRT). Another example is an operator entry device for a workstation. In addition to moving a cursor, a trackmarble can be utilized to perform other computer control functions such as updating a number, drawing a line, selecting a menu, etc.

(2) Description of the Prior Art

Present trackmarble to computer interfaces require the output quadrature data to be digitized into a parallel or serial digital word that the computer can read. The computer must periodically sample the trackmarble's quadrature output data, then process that data into a form suited to the Central Processing Unit's (CPU's) internal architecture.

The trackmarble is commonly used as a cathode ray tube (CRT) cursor control device. As the trackmarble is rotated, a cursor moves in any one of four X-Y quadrants across the CRT screen. If the cursor is in the lower left corner of the screen for example, and if the operator wants to move the cursor to the upper right corner of the screen, the computer must periodically read the trackmarble's output and relocate the cursor's position. If the distance from the lower left to the upper right represents a change of 1000 pixels in the X direction and 1000 pixels in the Y direction and if the trackmarble outputs 100 pixels per revolution, then the trackmarble must spin 10 times to generate, a change of 1000 pixels in both the X and Y directions. Most marbles can spin at best (4) revolutions per second, so a 1000 pixel change would take a minimum of 2.5 seconds. The CPU must read the trackmarble's output continuously in order to move the cursor 1000 pixels in a minimum of 2.5 seconds.

SUMMARY OF THE INVENTION

The rotational speed of a plurality of linear shaft encoders is measured. The shaft encoders are rotated by means of a ball, fingerwheel, or any combinations thereof. The present invention measures this speed and divides the measured speed into three regions. The first region is an insensitive region, the second region is a low velocity region, and the third region is a high velocity region. For the low and high velocity regions, the system outputs a lower or higher number based on user selected divider and multiplier parameters.

When the system is utilized as a Cathode Ray Tube (CRT) cursor control device, the rotational speed of the encoders is measured. Since the rotational speed is determined by the user, a fast rotational speed normally means a faster speed is desired; a moderate rotational speed normally means the desired speed is being utilized; and a slow rotational speed normally means a slower sped is desired. This system allows the user to move a cursor across a CRT screen much faster and/or much slower than normally achievable. The system responds to user selectable speed and positional adjustment parameters thereby altering the resolution of the shaft encoders.

BRIEF DESCRIPTION OF THE DRAWINGS

FIG. 3 is a schematic-block diagram of the switch/display assembly 14 of FIG. 1.

DESCRIPTION OF THE PREFERRED EMBODIMENT

Figure 1:
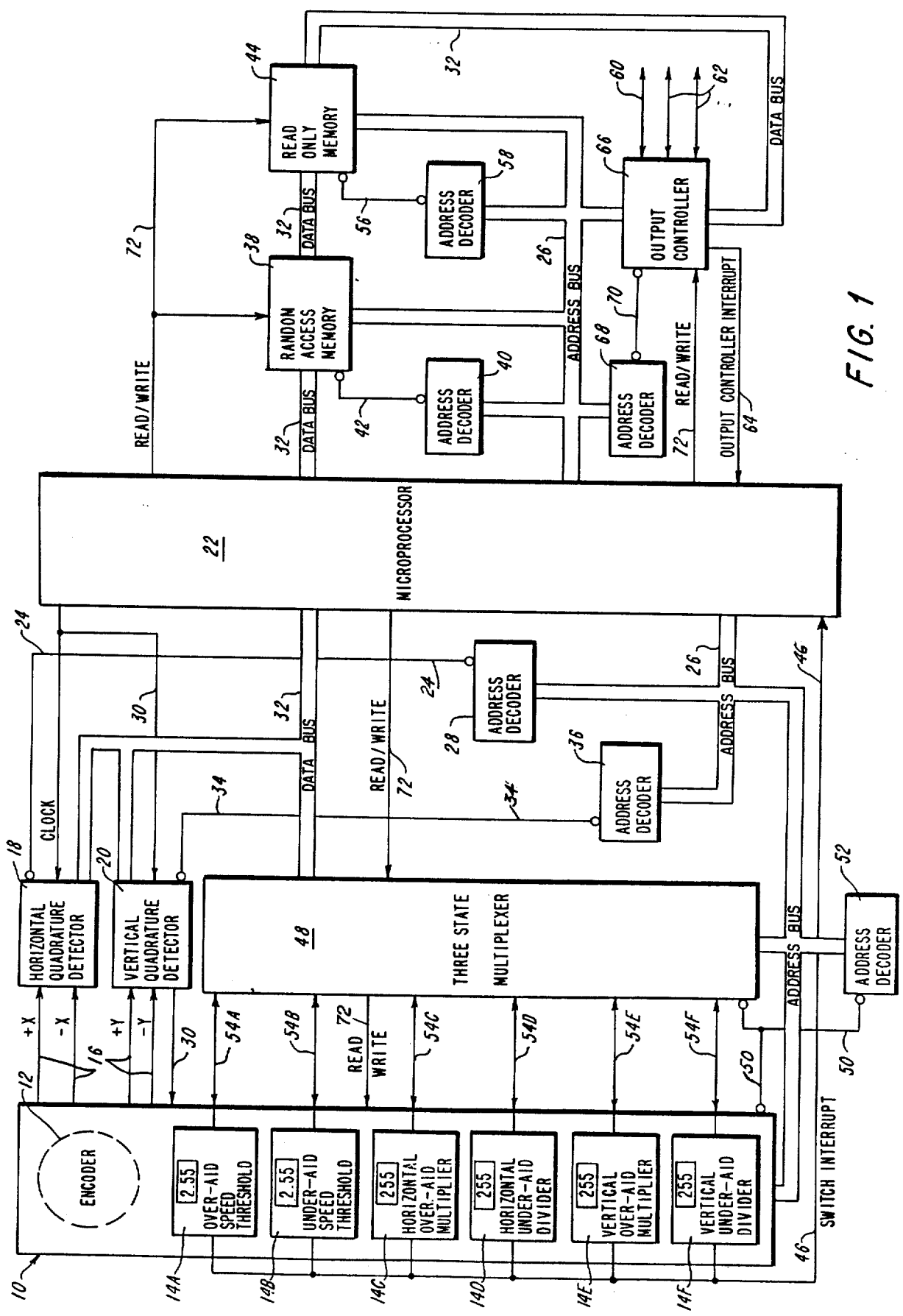
FIG. 1 is a block diagram of the computer peripheral rate aided sensing system including the switch display encoder apparatus in accordance with the present invention.

A solution to the problem of the CPU reading the trackmarble's output continuously, as mentioned in the Background of the Invention, would be to develop a system that "off-loads" the CPU from continuously monitoring the trackmarble's output. This system would preprocess the trackmarble's quadrature output whenever the trackmarble is rotated. The system would read the X and Y quadrature outputs of the trackmarble at a fixed sampling rate and preprocess the X and Y counts independently, subject to user selectable speed thresholds, rate aided multipliers and rate aided dividers. The X and Y outputs would be processed independently by one of the following three methods:

(1) Underaid—divide the gated number by a preselected divisor.
(2) No-Aid—no processing to the gated number.
(3) Overaid—multiply the gated number by a preselected multiplier.

By processing the data in any one of these three ways, the system could off-load the CPU from continuously monitoring the trackmarble's speed and could send to the host computer a processed or rate aided number. For a 100 pulse per revolution trackmarble, where each pulse corresponds to a one pixel change on the CRT, if the over-aid speed threshold is set to one revolution per second and if the trackmarble is spinning at four revolutions per second, then the over-aid speed threshold would become enabled. Enabling this over-aid speed threshold results in a multiplied value for the accumulated X and Y counts. If the system samples the rate output of the marble for 10 msec every 100 msec, the number of pulses counted in the 10 msec period would be:

$$4 \text{ Rev/sec} \times 100 \text{ pulses/rev} \times 10 \text{ msec} = 4 \text{ pulses.}$$

The system would the multiply the four pulses counted each 10 msec by a pre-selected rate multiplier, such as sixteen. The preprocessed digital output from the system would then be $$4 \text{ pulses} \times 16 = 64 \text{ pulses}$$

If the system outputs data to the CPU once every 100 msec, then in a 500 msec interval, the output data to the CPU would be as follows:

| TIME | PULSE OUTPUT |
| --- | --- |
| 100 msec | 4 × 16 = 64 |
| 200 msec | 4 × 16 = 64 |
| 300 msec | 4 × 16 = 64 |
| 400 msec | 4 × 16 = 64 |
| 500 msec | 4 × 16 = 64 |
| | TOTAL PULSE COUNT = 320 |

In 1000 msec or one second, 640 pulses would be sent. In 1.5 seconds, 960 pulses would be sent. In other words, a count of 960 could be sent to a computer in 1.5 seconds that would normally take approximately 2.5 seconds. This approximates the 1000 pixel change needed to relocate the cursor of a CRT from one extreme on the screen to the other and would be accomplished in approximately 1.5/2.5×4=2 2/5 revolutions of the trackmarble If the rate aided multiplier were doubled to 32, then the time required to output 960 pulses would be cut in half.

Conversely, if very fine resolution is desired when the trackmarble is rotating slowly, the under-aid speed threshold would enable the pre-selected under-aid dividers.

The rate-aided multipliers or dividers may not be ideal for all applications. In the above example, a multiplier of sixteen may be too large since the user may want to rotate the trackmarble for more than 1.5 seconds at 4 rev/sec in order to achieve a pulse count of 960. In this case, the operator can change the rate-aided multiplier by pressing a button or switch located on or near the trackmarble assembly. This condition would then alert the controller that a new multiplier be used.

Another method of changing the under-aid dividers or over-aid multipliers is to have the CPU issue a series of commands These commands are interpreted by the system's microprocessor program and will cause the rate-aided multipliers and dividers to change. Horizontal (X) and vertical (Y) multipliers for over-aiding and dividers for underaiding can be selected independently, thereby yielding various output slope configurations. Speed threshold levels that enable or disable the under-aid of over-aid thresholds can also be selected via switches or CPU commands.

Referring now to FIG. 1 there is shown an encoder and switch/display apparatus 10 comprising an encoder 12 and six switch/display assemblies 14a-f.

In the present description a trackmarble will be used for the encoder 12. It is to be understood that the term trackmarble used in describing the invention also refers to a computer mouse, trackball, fingerwheel or any type linear encoder The term trackmarble is also meant to describe various embodiments of encoder assemblies, such as a computer mouse and fingerwheel, trackball and fingerwheel, trackmarble and linear shaft encoder, etc.

The output from trackmarble 12 is connected to quadrature detectors 18 and 20 by means of four wires 16 labeled +X, −X, +Y and −Y. Additional quadrature detectors and support circuitry when added, support additional encoders such as +Z and −Z. As the trackmarble is rotated, one of the following three situations occurs:

(1) A series of pulses from both the +X and −X wires occur with no pulses present on either the +Y or −Y wires. This situation implies rotation of the trackmarble in the +X or −X direction only.

(2) A series of pulses from both the +Y and −Y wires occur with no pulses present on either the +X or −X wires. This situation implies rotation of the trackmarble in the +Y or −Y direction only.

(3) A series of pulses from the +X, −X, +Y and −Y wires occur. This situation implies rotation of the trackmarble in the +X+Y, +X−Y, −X+Y or −X−Y direction.

For any one of these three situations, horizontal (X) quadrature digital detector 18 and vertical (Y) quadrature digital detector 20 accept incremental encoder signals over wires 16, perform quadrature detection, and count the number of incremental X and Y encoder pulses in eight bit up/down counters which are contained in quadrature digital detectors 18 and 20. Direction sensing and up/down count accumulation are processed in quadrature detectors 18 and 20. The result is two two's complement numbers that microprocessor 22 can read.

Figure 2:
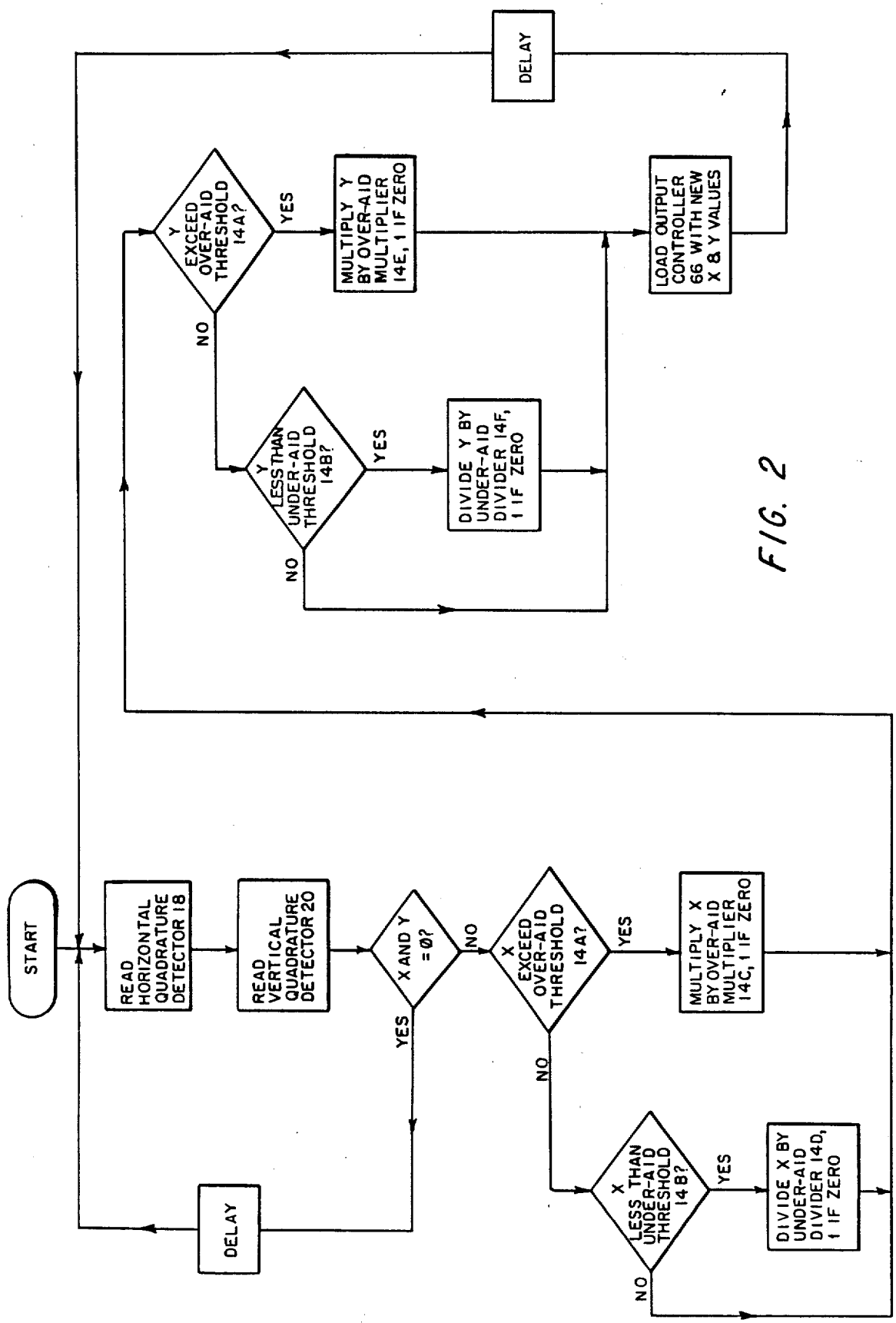
FIG. 2 is a flow chart of the operation of read only memory (ROM) 44 in the block diagram of FIG. 1.

When power is first applied to the system, microprocessor 22 points to an internally selected reset interrupt vector address. Then, using address bus 26, all connected components sense the internally selected reset interrupt vector address. One of the address decoders, such as 58, upon sensing this address, responds by dropping select line 56 to a logic low which in turn enables read only memory 44. Read/write line 72 is at a logic level high which indicates that microprocessor 22 is set to read data using data bus 32. Read only memory 44 is now enabled and it outputs data onto data bus 32 to microprocessor 22. This output is the starting address of the power-on routine stored in read only memory 44 which instructs microprocessor 22 to read horizontal and vertical quadrature detectors 18 and 20, which clears their internal eight bit up/down counters. The routine next instructs microprocessor 22 to clear all six switch/display assemblies 14a-f via address bs 26, read/write line 72, data bus 32, three state multiplexer 48 and bi-directional switch output lines 54a-f. Address decoder 52 and select line 50 enable the three state multiplexer 48 and control circuitry for switch/display assemblies 14a-f. When the power-on routine is completed, the instructions stored in read only memory 44 instruct microprocessor 22 to begin executing the program shown in FIG. 2. If the trackmarble 12 remains stationary during or after the power-on routine, output lines 16 remain stable, which results in a zero state for the two eight bit counters in quadrature detectors 18 and 20. As shown in FIG. 2, whenever both X and Y counts are zero, microprocessor 22 inhibits output controller 66 from transmitting serial or parallel data. The program stored in read only memory 44 instructs microprocessor 22 to continue reading horizontal and vertical quadrature detectors 18 and 20 until a non-zero condition is met.

After power has been applied to the system, the operator can actuate any one of the switch/display assemblies 14a-f to preset speed thresholds, over-aid multipliers and under-aid dividers. The method of inputting switch/display values is described later.

The flow chart of FIG. 2 shows that microprocessor 22 first reads horizontal quadrature detector 18 by asserting select line 24 using address bus 26 and address decoder 28. Now that horizontal quadrature detector 18 has been selected, a low to high transition of clock line 30 places the two's complement horizontal (X) count accumulation on data bus lines 32. This count relates to the accumulated horizontal (X) count from the time of the last microprocessor read. After the horizontal (X) count has been read by microprocessor 22, select line 24 goes high, disabling the output of horizontal (X) quadrature detector 18. The internal up/down counter in quadrature detector 18 is reset to zero when microprocessor 22 performs a read operation.

Data bus lines 32 from horizontal quadrature detector 18 are now in a high impedance state. Microprocessor 22 next enables select line 34 on vertical (Y) quadrature detector 20 via address lines 26 and address decoder 36. When clock line 30 goes high, the accumulated count representing movement of trackmarble 12 in the Y direction will be placed on data bus lines 32. The X and Y accumulated counts are now sequentially stored in random access memory 38 using address bus 26, address decoder 40, select line 42 and data bus 32. Microprocessor 22 then continues executing the program stored in read only memory 44 and depicted in FIG. 2.

Quadrature detectors 18 and 20 are read periodically by microprocessor 22 at time intervals pre-programmed by read only memory 44. The time to execute any one of the routine sequences depicted in FIG. 2 is negligible compared to the sampling frequency of digital detectors 18 and 20. Therefore, the sampling frequency need not be altered based upon the over-aid, no-aid or under-aid sequence taken. The approximate sampling time is represented by the delay blocks shown in FIG. 2.

Switch/display assemblies 14a-f comprise pushbutton switches and integrally mounted numeric displays. A pushbutton was chosen for ease of assembly but any type of switch could be used. As the operator actuates one of he switches, an internal digital counter begins counting up using clock line 30. The output o this counter is continuously displayed via the numeric display mounted as part of or near the switches. When the operator releases the switch, the counter stops with the numeric display indicating the state of the counter, and an interrupt signal 46 is sent to microprocessor 22. Microprocessor 22 hen exits from the routine shown in FIG. 2 and initiates six external read cycles by selecting and reading the three stage multiplexer 48 via select line 50, address bus 26, address decoder 52 and read/write line 72. A logic high on read/write line 72 sets the direction of data flow from the three state multiplexer 48 to microprocessor 22. The six switch/display assemblies 14a-f are sequentially read by microprocessor 22 using bi-directional I/O lines 54a-f, three state multiplexer 48 and data bus lines 32. The program stored in read only memory 44 instructs microprocessor 22 to compare previously stored switch settings with new switch settings. All new switch values are changed in random access memory 38 and all unchanged switch values are retained All switch settings are loaded into output controller 66 for transmission to an external CPU. Microprocessor 22 then resumes the sequence shown in FIG. 2 from the point of exit mentioned above.

A similar case exists if the host CPU issues commands from serial interface line 60 or parallel interface lines 62 interrupting microprocessor 22 by means of output controller interrupt line 64. During the execution of switch interrupt 46 or output controller interrupt 64, quadrature digital detectors 18 and 20 continue to process X and Y encoder pulses. When the interrupt routines initiated by switch interrupt 46 and/or output controller interrupt 64 are completed, microprocessor 22 reads quadrature digital detectors 18 and 20 which resets their internal up/down counters to zero. The X and Y accumulated counts read during the interrupt routine are always ignored by microprocessor 22.

Once the system completes the sequence depicted in FIG. 2, rate aided X and Y numbers are sent to output controller 66 which assembles the processed data for both serial and parallel interface protocols. Output controller 66, upon receiving commands over lines 60 or 62, interrupts microprocessor 22 via interrupt line 64. The algorithm stored in read only memory 44 instructs microprocessor 22 to read the contents of output controller 66 via select line 7, address decoder 68, address bus 26, data bus lines 32 and read/write line 72. Commands received from output controller 66 are interpreted by the algorithm in read only memory 44 and any new speed thresholds, underaid dividers and overaid multipliers are stored in random access memory 38 and written to switch/display assemblies 14a-f using read/write line 72, data bus lines 32, address bus 26, address decoder 52, select line 50, three state multiplexer 48 and bidirectional I/O lines 54a-f. The accumulated X and Y counts read during this interrupt routine are ignored by microprocessor 22.

Switch/display assemblies 14a-f permit the user to select a variety of under-aid dividers and over-aid multipliers independently for both the horizontal (X) and vertical (Y) pulse count. If the (X) over-aid multiplier is set to "two" using switch/display assembly 14c and the Y overaid multiplier set to "one hundred" using switch/display assembly 14e, and if the trackmarble is spinning at exactly a forty-five degree angle, fast enough to enable the overaid threshold in both the X and Y directions, then microprocessor 22, using the algorithm stored in read only memory 44 and shown in FIG. 2, will multiply the X value by "two" and the Y value by "one hundred," yielding a slope of "fifty." Similar settings can be achieved using the under-aid divider switch/display assemblies 14d and 14f.

Speed threshold switch/display assemblies 14a and 14b can also be used t set the under-aid and over-aid speed threshold points respectively for both the X and Y pulse counts. All multiplier, divider and speed threshold switches utilize eight bidirectional input/output lines 54a-f, providing for 256 possible combinations for each switch setting. Multiply and divide by zero situations are interpreted by the algorithm stored in read only memory 44 as "no-aid" values and act as multiply or divide by one situations.

Speed threshold values from 0 to 255 can be entered, with 2.55 representing a 2.55 revolutions/second speed threshold for a 100 pulse/revolution trackmarble. Various size trackmarbles with greater or fewer pulses/revolution may require different speed threshold settings and read only memory 44 can be pre-programmed to scale the eight bit under-aid and over-aid speed thresholds accordingly. Over-aid speed thresholds must always exceed under-aid thresholds; microprocessor 22 is programmed via read only memory 44 to ignore improper speed threshold settings.

Output controller 66 is used to assemble processed data for both parallel and serial outputs and connection to a host Central Processing Unit (CPU). This output controller can handshake with the host CPU via serial line 60 using standard EIA (RS-232, RS-422, etc.) protocols or lines 62 using a standard parallel protocol. If two bytes are used to represent X and Y data, then one bit in each byte can be reserved to indicate trackmarble direction such as $+X,+Y$, $+X,-Y$, $-X,+Y$, or $-X,-Y$. The first output byte can represent the processed X value and the second byte can represent the processed Y value. Other combinations of X and Y byte groupings can be used to accommodate rate-aided values utilizing more than seven bits of data and one bit for direction.

Output controller 66 is loaded with position adjustment and speed threshold parameters upon system initialization. These parameters are also loaded into output controller 66 whenever switch interrupt line 46 interrupts microprocessor 22, indicating that the parameters have been changed. The interrupt routine stored in ROM 44 instructs microprocessor 22 to read, update, and subsequently store these parameters in RAM 38 as described previously. The interrupt routine also instructs microprocessor 22 to load these parameters into output controller 66. These parameters are then transmitted using serial I/O line 60 or parallel I/O lines 62 of output controller 66 to the host CPU or some other external system. The transmission of this parameter data could be "framed" by special control characters so that the host CPU would not interpret this data as encoder movement. The host CPU could be programmed to compare the operator selected parameters with those parameters set by the CPU. If a difference occur,, the host CPU could transmit its parameter settings to the sensing system and switch display apparatus 14, overriding any one or all of the operator selected parameters.

The following is a description of components shown in FIG. 1. Horizontal quadrature detector 18 and vertical quadrature detector 20 are off-the-shelf integrated circuits designed to interface a standard two phase incremental encoder (either linear or rotary) with a microprocessor or microcomputer. This integrated circuit accepts two phase incremental encoder signals directly, performs the quadrature detection, and counts the number of incremental encoder pulses in an internal eight bit up/down counter. An internal separate hardware latch latches the exact count in the eight bit counter whenever the integrated circuit is enabled via the chip select lines 24 and 34. Direction detection and up down count accumulation result in a 2's complement number that is directly readable by the system microprocessor 22. The information provided by this integrated circuit aids in calculating acceleration, velocity (speed), and position of an incremental encoder such as a linear shaft encoder, trackmarble or mouse. The inherent features provided by this integrated circuit significantly reduce software overhead for the microprocessor 22.

Random Access Memory 38 is a standard off-the-shelf read/write memory that allows microprocessor 22 to write data to a specified location and read data from a specified location Random Access Memory 38 is used for temporary storage of program instructions and data; its contents are lost when power is removed.

Read Only Memory 44 is a standard off the shelf item that contains the programmed instructions to control microprocessor 22. Read Only 44 Memory does not lose the information that it contains when power is removed. The routine shown in FIG. 2 is contained in Read Only Memory 44.

Address decoders 52, 36, 28, 40, 58 and 68 are off-the-shelf digital circuits configured to decode the logical state of address bus 26 continuously and enable or disable sections of circuitry via select lines 50, 34, 24, 42, 56 and 70. All components connected to microprocessor 22 are memory mapped to respond to the logical state of these various address decoders.

The output controller 66 is an off-the-shelf integrated circuit that externally interfaces to both a standard serial RS-232 input/output line and a standard eight bit parallel data bus The output controller 66 includes a switch that is used to select either the parallel or serial input/output feature. Output controller 66 contains three state data lines that connect to microprocessor's 22 three state data bus 32. Output controller 66 is enabled using chip select line 70 from address decoder 68 and address bus 26 from microprocessor 22, and read/write line 72 from microprocessor 22.

Three state multiplexer 48 comprises of-the-shelf digital circuits that are enabled using select line 50 from address decoder 52 and address bus 26 from microprocessor 22. Bi-directional data lines 54a-f are selected whenever microprocessor 22 outputs six specific addresses using address bus 26. Address decoder 52 responds to these addresses by dropping select line 50 to a logic low. Select line 50 remains low as microprocessor 22 cycles through all six of these addresses. Each address selects a particular group of bi-directional data lines. Read/write line 72 from microprocessor 22 selects the direction of data flow when multiplexer 48 is enabled.

Microprocessor 22 is an off-the-shelf microprocessor with a bi-directional data bus 32, address bus 26, interrupt request inputs 46 and 64, an internal pre-programmed instruction set and a read/write line 72. Any off-the-shelf microprocessor or microcontroller can be utilized to carry out the program routine shown in FIG. 2. Different manufacturers incorporate some standard microprocessor features a little differently, such as using separate read and write lines. These differences can be easily integrated into a mouse or trackmarble rate aiding system described in this disclosure by someone with ordinary skill in the art.

Trackmarble and switch/display assembly 10 contain signal lines 16 for trackmarble quadrature outputs. The remaining signal lines connected to trackmarble and switch/display assembly 10 are bi-directional input-/output lines 54a-f, read/write line 22, clock line 30, select line 50, address bus 26 and switch interrupt line 46. These remaining signal lines and their operation will be discussed in reference to FIG. 3.

FIG. 3 shows an arrangement for one switch/display assembly 14. Switch/display assembly 14 is any of the switch/display assemblies 14a-f shown in FIG. 1. Switch 73 is a double pole, double throw switch shown in the normally closed (NC) position. When switch 73 is depressed, both switch poles connect to the normally open (NO) position. This condition forces line 74 to a logic LOW which enables gate 76 and allows a clock signal on lie 30 to pass through line 78 to up counter 80. As long as switch 73 is held in this normally open (NO) state, up counter 80 will continuously count up. The output from up counter 80 is fed to a decoder 84 which drives numeric display 85. During this up count sequence while switch 73 is in the normally open (NO) position, switch interrupt line 46 is forced to a logic LOW. Microprocessor 22, shown in FIG. 1, responds to an interrupt using interrupt line 46 when line 46 makes a transition from a logic LOW to a logic HIGH state. Therefore, as long as switch 73 is held in the normally open (NO) position, microprocessor 22 will not respond to the interrupt request and exit from the program shown in FIG. 2. However, when switch 73 is released, interrupt request line 46 will change from a logic LOW to a logic HIGH, interrupting microprocessor 22 and initiating an interrupt routine. At the start of this interrupt routine, microprocessor 22 will output a specific address using address bus 26. Address decoder 52, shown in FIG. 1, will respond to this specific address and drop select line 50 to a logic LOW. Microprocessor 22 will also set its read/write line 72 to a logic HIGH, indicating a READ state. Multiplexer 86 is used to select the first switch/display assembly that microprocessor 22 will read. The output of multiplexer 86 appears on line 88 and is applied to AND gate 90. With multiplexer output line 88 and select line 50 at a logic LOW state, output line 92 is LOW. This condition enables bi-directional three state driver 94. Read/write line 72 is at a logic HIGH which selects output line 82 from up counter 80. Microprocessor 22 now reads the contents of up counter 80 through bi-directional three state driver 94 and bi-directional data line 54a to three state multiplexer 48 to data bus 32. This interrupt sequence continues until all six switch/display assemblies are read by microprocessor 22. At the completion of the interrupt sequence, select line 50 goes to a logic HIGH, disabling the bi-directional three state drivers. This condition places all bi-directional data lines 54a–f in a high impedance state.

When the sensing system receives data from output controller 66, microprocessor 2 outputs the same specific address locations as used for a switch interrupt sequence. The only difference is that microprocessor 22 issues a write sequence by setting read/write line 72 to a logic LOW. This logic LOW condition on line 22 and a logic LOW on line 92 from select line 50 and multiplexer output line 88 being LOW sets line 96 LOW. A LOW on line 96 presets up counter 80 with data sent from microprocessor 22 via data bus 32, three state multiplexer 48, to bi-directional I/O line 54a. Data arriving on line 54a passes through bi-directional three state driver 94 to data in line 98. Once up counter 80 is preset with this new data, output line 82 changes to this new data, which drives decoder 84 and numeric display 85. Numeric display 85 now indicates the new data value. New data values arriving via output controller 66 are stored in random access memory 38 and this new data is used when sequencing through the program shown in FIG. 2.

The description of the preferred embodiment utilizes a two dimensional encoder apparatus that outputs positional data in the horizontal (X) and vertical (Y) axis. The invention is capable of other embodiments and of being practiced or carried out in a variety of ways. For example, additional encoders, quadrature digital detectors (shown in FIG. 1), and support software when added to the apparatus and sensing system would not depart from the spirit and scope of the invention. Combinations of encoders can be constructed to yield a computer mouse and a fingerwheel actuated encoder apparatus, thereby outputting data not only in the X and Y axis (mouse), but also in the Z axis (fingerwheel) as well. Other embodiments combining for example, three liner shaft encoders, trackball and a fingerwheel, etc., could be constructed Additional switch display assemblies 14 (shown in FIG. 3) could also be integrated into the switch display encoder outputs. Present day computer trackball and mouse assemblies usually incorporate a plurality of switches for outputting non-encoder related data such as carriage returns (ASCII 13), cursor controls, etc. The procedure for integrating these switches and their associated electronics is well known in the art. These switches added to the switch display encoder apparatus 10 to complement the operation of the switch display assemblies 14 does not depart from the scope of the invention.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A computer peripheral rate aided sensing system comprising:

encoding means for determining positional data, said encoding means also for generating and transmitting encoded signals indicative of said positional data;

position incremental detection and computation means connected to said encoding means for receiving said encoded signals and for computing the incremental movement of position in said encoding means represented by said encoded signals over a fixed period of time and for providing output signals thereof;

switching means for selecting modifications to said positional data, said switching means including position adjustment selectors and speed threshold parameter selectors, said switching means also for generating and transmitting signals indicative of the settings of said position adjustment selectors and said speed threshold parameter selectors;

transferring means connected to said switching means for receiving said switching means transmitted signals and for transmitting said signals indicative of the settings of said position adjustment selectors and said speed threshold parameter selectors;

operating means connected to said position incremental detection and computation means, and to said transferring means for respectively receiving said position incremental detection and computation means output signals, and said transferring means transmitted signals for generating and providing output signals representing the incremental movement of position in said encoded signals modified by the settings of said position adjustment selectors and said speed threshold parameter selectors; and controlling means connected to said operating means for receiving and providing an output for said operating means output signals.

2. A computer peripheral rate aided sensing system according to claim 1 wherein said encoder means comprises a trackball.

3. A computer peripheral rate aided sensing system according to claim 1 wherein said encoder means comprises a trackmarble.

4. A computer peripheral rate aided sensing system according to claim 1 wherein said encoder means comprises a mouse.

5. A computer peripheral rate aided sensing system according to claim 1 wherein said encoder means comprises a fingerwheel actuated encoder.

6. A computer peripheral rate aided sensing system according to claim 1 wherein said encoder means comprises a trackball and a fingerwheel actuated encoder.

7. A computer peripheral rate aided sensing system according to claim 1 wherein said encoder means comprises a trackmarble and a fingerwheel actuated encoder.

8. A computer peripheral rate aided sensing system according to claim 1 wherein said encoder means comprises a mouse and a fingerwheel actuated encoder.

9. A computer peripheral rate aided sensing system according to claim 1 further comprising:
   said controlling means further for receiving and transmitting externally generated modifying signals representing modifications to said position incremental detection and computation means output signals;
   said operating means connected to said controlling means for receiving said externally generated modifying signals and for generating and transmitting signals representing the incremental movement of position in said encoded signal modified by said externally generated modifying signals; and
   said controlling means connected to said operating means for receiving and providing an output for said signals representing the incremental movement of position in said encoded signal modified by said externally generated modifying signals.

10. A computer peripheral rate aided sensing system according to claim 9 wherein said encoder means comprises a trackball.

11. A computer peripheral rate aided sensing system according to claim 9 wherein said encoder means comprises a trackmarble.

12. A computer peripheral rate aided sensing system according to claim 9 wherein said encoder means comprises a mouse.

13. A computer peripheral rate aided sensing system according to claim 9 wherein said encoder means comprises a fingerwheel actuated encoder.

14. A computer peripheral rate aided sensing system according to claim 9 wherein said encoder means comprises a mouse and a fingerwheel actuated encoder.

15. A computer peripheral rate aided sensing system according to claim 9 wherein said encoder means comprises a trackball and a fingerwheel actuated encoder.

16. A computer peripheral rate aided sensing system according to claim 9 wherein said encoder means comprises a trackmarble and a fingerwheel actuated encoder.

* * * * *